2,967,852
LOW PRESSURE POLYOLEFINE WITH A PHOSPHORIC ACID SALT STABILIZER

Albert Frese, Marl, Kreis Recklinghausen, Germany, assignor to Chemische Werke Huls Aktiengesellschaft, Marl, Kreis Recklinghausen, Germany No Drawing. Filed May 13, 1958, Ser. No. 734,857

Claims priority, application Germany Nov. 14, 1957

1 Claim. (Cl. 260—45.9)

It is known that low-pressure polyolefins which are made by the so-called Ziegler process contain impurities derived from the catalyst used in the low-pressure polymerization process, particularly chlorine-containing aluminum and titanium compounds which are difficult to remove completely. These catalyst residues and also iron compounds derived from the apparatus used in the polymerization process impart objectionable color, usually gray to brown to the polyolefines. Moreover these impurities act as depolymerization catalysts and thus lower the ageing stability of the polyolefines. It is known to add stabilizers, particularly antioxidants such as polynuclear phenols, amines, thiocarbamates and the like to low-pressure polyolefines for the purpose of improving their ageing properties and such additions are effective for this purpose but they are not effective for eliminating the discoloration and in fact generally are harmful in this respect in that they contribute their own colors.

It is also known that low-pressure polyolefines have an unsatisfactory transparency due to their high crystallinity. It has been proposed to improve the low-pressure polyolefines in this respect by the addition of aliphatic, cycloaliphatic and aromatic esters, acid esters and ester salts of phosphorous and phosphoric acids. These additions are effective for improving the color of the low-pressure polyolefines but suffer from the limitation that they decompose at about 250° C. and are therefore not only ineffective but actually harmful in the very high molecular weight polyolefins which must be worked at relatively high temperatures.

It has now been found that low-pressure polyolefines containing impurities as described above can be improved by additions of small quantities of alkali metal salts of oxygen acids of phosphorus. Among the low-pressure polyolefines which are susceptible to this treatment are the Ziegler process thermoplastic polymerizates, mixed polymerizates and polymerizate mixtures derived from α-olefines such as ethylene, propylene, butylene etc. Examples of the usable alkali metal salts of oxygen acids of phosphorus are the primary, secondary and tertiary sodium, potassium and ammonium salts of orthophosphoric acid, the secondary and quaternary sodium, potassium and ammonium salts of pyrophosphoric acid and the sodium, potassium and ammonium salts of metaphosphoric and phosphorous acids. These salts are used in quantities within the range from .005% to 2% by weight and preferably within the range from .01 to 1% by weight based upon the weight of the low-pressure polyolefine. They can be added to aqueous or non-aqueous suspensions of the polyolefine during the processing thereof or they may be mixed with the dry finely divided polyolefine. The salts of oxygen acids of phosphorus eliminate the objectionable specific color which the crude low-pressure polyolefines possess as a result of contamination by catalyst residues, iron compounds, etc. and avoid discoloration caused by the addition of the customary antioxidants and other stabilizers. The transparency of the products also is improved. Moreover the salts have a stabilizing effect so that in many instances the customary addition of other stabilizers may be omitted.

It has been found that the above described alkali metal salts of oxygen acids of phosphorus when used together with antioxidants of the group consisting of substituted, multi ring and multi valent phenols and amines such as diphenylamine, dianile and condensation products of phenols, secondary amines and formaldehyde, surprisingly, give stabilizing effects which are far greater than the sum of their separate effects. Suitable anti-oxidants for use with the salts are 2,2'-methylene-bis-(4-methyl-6-tert. butylphenol), O-cresylcamphane, methylglyoxaldi-(aminophenol), etc. which may be used in amounts within the range from 0.01% to 5% by weight based on the weight of the polyolefine.

The alkali metal salts of oxygen acids of phosphorus and the anti-oxidants are either mixed with each other before addition to the low-pressure polyolefine or they may be added separately and either successively or simultaneously as desired.

The invention is illustrated by the following specific examples.

EXAMPLE 1

2000 parts by weight of polyethylene ($\eta_{red}$ 3.5) are mixed with 2 parts by weight of potassium pyrophosphate, $K_4P_2O_7$, and 0.2 part by weight of o-cresylcamphane and processed on an injection molding machine. The transparent injection-molded parts obtained are aged for 20 days at 100° C. After this aging they are neither brittle nor discolored. No oxidation bands can be established in the infra-red spectrum.

Injection molded parts prepared as described above but without phosphate addition are colored yellowish brown and become brittle after aging for 10 days at 100° C. They show CO-bands in the infra-red spectrum.

EXAMPLE 2

2000 parts by weight of polyethylene ($\eta_{red}$ 2.0) are mixed with one part by weight of sodium phosphite, $Na_2HPO_3$. By processing on an injection molding machine colorless, transparent polyethylene injection molded parts are produced. The electrical loss angle tan $\delta$ is less than $0.1 \cdot 10^{-3}$ and rises only to $0.8 \cdot 10^{-3}$ after an aging period of 20 days at 100° C.

The polyethylene processed without the addition of phosphite has a grey color. The electrical loss angle tan $\delta$, which is smaller than $0.1 \cdot 10^{-3}$ initially, rises to $5.4 \cdot 10^{-3}$ in the course of the 20 day long aging at 100° C.

EXAMPLE 3

1000 parts by weight of polyethylene ($\eta_{red}$ 2.3) are mixed with 2 parts by weight of sec. sodium orthophosphate, $Na_2HPO_4$. By processing on an injection molding machine colorless, transparent polyethylene injection molded parts are produced. In the course of a 20 day aging at 100° C. the electrical loss angle tan $\delta$ rises from less than $0.1 \cdot 10^{-3}$ to $0.9 \cdot 10^{-3}$.

The polyethylene processed without addition of phosphate has an electrical loss angle tan $\delta$ of less than $0.1 \cdot 10^{-3}$, which however rises to $5.1 \cdot 10^{-3}$ upon aging 20 days at 100° C.

The light absorption is lowered to less than half by the addition of $Na_2HPO_4$ as can be seen from the following table.

*Absorption with 1 mm. layer thickness*

| Color filter | blue | green | red |
|---|---|---|---|
| Without addition | 19.5 | 15.1 | 13.2 |
| Plus 0.2% $Na_2HPO_4$ | 7.6 | 6.5 | 6.2 |

EXAMPLE 4

1000 parts by weight of polypropylene ($\eta_{red}$ 3.0) are mixed with 2 parts by weight of primary sodium orthophosphate, $NaH_2PO_4$ and 0.1 part by weight of 2,2'-methylene-bis-(4-methyl-6-tert.-butylphenol) and processed on an injection molding machine. Colorless, transparent polypropylene injection molded parts are produced which show no modification after 20 day aging at 100° C.

Polypropylene processed without phosphate is discolored yellowish by the stabilizer and becomes brittle after a 10 day aging at 100° C.

EXAMPLE 5

1000 parts by weight of polypropylene ($\eta_{red}$ 4.5) are mixed with one part by weight of sodium metaphosphate $(NaPO_3)_n$ and 0.5 part by weight of the condensation product of tert.-butyl-p-cresol, piperidine and formaldehyde, and processed on an injection molding machine. Colorless, transparent molded parts are produced.

EXAMPLE 6

1000 parts by weight of polybutylene ($\eta_{red}$ 5.0) are mixed with two parts by weight tert.-ammonium orthophosphate $(NH_4)_3PO_4$ and 0.1 part by weight of methylglyoxal-di-(aminophenol) and processed as described above. Colorless, transparent polybutylene is produced which shows no modification after 20 day aging at 100° C.

I claim:

A composition of matter comprising a normally solid, low-pressure poly-α-olefine in which the α-olefine contains from 2 to 4 carbon atoms, from 0.005% to 2%, based on the weight of the polyolefine, of an alkali metal salt of an oxygen acid of phosphorus selected from the group consisting of orthophosphoric acid, pyrophosphoric acid, metaphosphoric acid and phosphorous acid and from 0.01% to 0.5%, based on the weight of the polyolefine, of an anti-oxidant selected from the group consisting of 2,2'-methylene-bis-(4-methyl-6-tert.-butylphenol), o-cresylcamphane and methylglyoxal-di-(aminophenol).

References Cited in the file of this patent

UNITED STATES PATENTS

| | | |
|---|---|---|
| 2,218,645 | Japs | Oct. 22, 1940 |
| 2,364,410 | Whittaker | Dec. 5, 1944 |
| 2,507,142 | Chaban | May 9, 1950 |
| 2,581,360 | Costa et al. | Jan. 8, 1952 |
| 2,675,366 | Pullman | Apr. 13, 1954 |
| 2,727,879 | Vincent | Dec. 20, 1955 |
| 2,834,768 | Friedlander | May 13, 1958 |